US011011972B1

(12) United States Patent
Sreenivas

(10) Patent No.: US 11,011,972 B1
(45) Date of Patent: May 18, 2021

(54) FREQUENCY ALIGNMENT AND SWITCH-OVER IN POWER SUPPLIES

(71) Applicant: Infineon Technologies Austria AG, Villach (AT)

(72) Inventor: Venkat Sreenivas, Winchester, MA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/686,536

(22) Filed: Nov. 18, 2019

(51) Int. Cl.
*H02M 1/084* (2006.01)
*G06F 1/26* (2006.01)

(52) U.S. Cl.
CPC ............ *H02M 1/0845* (2013.01); *G06F 1/26* (2013.01)

(58) Field of Classification Search
None
See application file for complete search history.

(56) References Cited

U.S. PATENT DOCUMENTS

| 9,035,594 | B2* | 5/2015 | Takamatsu | H02P 6/10 |
| | | | | 318/610 |
| 10,211,737 | B1* | 2/2019 | Costa | H02M 3/157 |
| 2012/0274146 | A1 | 11/2012 | Laur et al. | |
| 2014/0184180 | A1 | 7/2014 | Kronmueller | |
| 2018/0026526 | A1* | 1/2018 | Ahmed | H02M 3/1584 |
| | | | | 323/271 |

\* cited by examiner

*Primary Examiner* — Lincoln D Donovan
*Assistant Examiner* — Khareem E Almo
(74) *Attorney, Agent, or Firm* — Armis IP Law, LLC

(57) ABSTRACT

An apparatus includes a power converter and a controller. The power converter converts a received input voltage into an output voltage that powers a dynamic load. The controller controls a setting of a switching frequency applied to the power converter. During one operational mode, the controller transitions a setting of the switching frequency of the power converter from a first clock frequency signal to a second clock frequency signal depending on occurrence of phase alignment of the second clock frequency signal and the first clock frequency signal, which may eventually occur over multiple switching control cycles. Transition of the switching frequency from the first clock frequency signal to the second clock frequency signal at or around a time of the phase alignment reduces possible perturbations in the output voltage as a result of the clock frequency switchover.

36 Claims, 14 Drawing Sheets

FREQUENCY ALIGNMENT AND SWITCH-OVER IN POWER SUPPLIES

BACKGROUND

In many conventional applications, voltage regulators (VRs) need to synchronize their control signals such as pulse width modulation pulses to a master external synchronizing clock. This occurs in the telecommunication market where electro-magnetic noise is a concern and beat frequencies arising out of closely spaced switching frequencies are not tolerated.

In certain instances, a voltage regulator needs to deviate from the frequency dictated by the master external clock. For example, a voltage regulator switches to use of a frequency other than the master clock during a Transient Response (TR) or if it operates in Discontinuous Conduction Mode (DCM). When the TR condition or DCM is over, the voltage regulator needs to operate off the external sync clock again.

BRIEF DESCRIPTION

This disclosure includes the observation that conventional power supply control techniques suffer from deficiencies. For example, abrupt power supply switching frequency transitions negatively impact an ability to produce a steady output voltage.

Additionally, it should be noted that it is not simple to shift PWM control pulses to align such signals with respect to a master clock. This is because in many voltage regulator architectures, the timing and sequence of pulses are very important. If the controller is operated to abruptly switchover from a temporary clock to using the master clock without consideration of phase differences, there is a danger that the controller might generate a wrong duty cycle, saturate a respective transformer of the power supply, saturate a respective output inductor, violate dead times, etc.

Embodiments herein include novel ways of controlling multiple phases and phase resynchronization in a power supply to produce an output voltage. For example, a controller as described herein provides a novel way of transitioning control of a power converter from a first switch frequency to a second switch frequency based on detected phase alignment as further discussed herein.

More specifically, embodiments herein include an apparatus. The apparatus includes a power converter and a controller. During operation, the power converter is operative to convert a received input voltage into an output voltage that powers a dynamic load. The controller controls a setting of a switching frequency applied to control switching operation of the power converter. For example, during one operational mode, the controller transitions the setting of the switching frequency of the power converter from a first clock frequency (signal) to a second clock frequency (signal) depending on phase alignment of the first clock frequency (signal) and the second clock frequency (signal).

In one embodiment, during an asynchronous operational mode, the first clock frequency signal and the second clock frequency signal are not aligned. However, because the first clock frequency signal and the second clock frequency signal are different settings (one larger than the other), eventually the first clock frequency signal and the second clock frequency signal align over multiple switching control cycles. The transition of the switching frequency from the first frequency signal to the second frequency signal (master frequency signal) at or around the time of alignment substantially reduces or prevents perturbations in the output voltage (and/or disturbance to the circuit) as a result of the clock frequency transition.

In accordance with further embodiments, the second clock frequency signal as described herein is a predetermined fixed (master) frequency used to control switching operation of the power converter during non-transient load conditions. In response to detecting a condition such as a change in an amount of current consumed by a load, variation in a magnitude of the output voltage, or any other power supply condition, the controller temporarily sets the switching frequency of the power converter to the first clock frequency signal (asynchronous mode, which is possibly needed) to maintain regulation of the output voltage within a desired range due to a transient condition.

In one non-limiting example embodiment, the controller switches over from setting the switching frequency from the second clock frequency signal (master clock frequency) to the first clock frequency signal (asynchronous clock frequency) in response to detecting a change in current consumption by the dynamic load.

In one embodiment, the first clock frequency signal is greater in value (such as greater in magnitude) than the second clock frequency signal to provide better transient response. For example, operation of the power converter at the higher switching frequency increases a responsiveness of the power converter to maintain the output voltage in regulation during transient current consumption conditions.

If desired, the controller varies a value (a.k.a., setting) of the first clock frequency signal as well as corresponding pulse width modulation signals applied to the power converter to maintain a magnitude of the output voltage within a desired operational range.

In accordance with still further embodiments, after the detected trigger condition or conditions are eliminated or reduced while operating the power converter at the first clock frequency, the controller initiates switchover back to the second clock frequency (master clock frequency). In one embodiment, to assist in a smooth switchover from operating off the first clock frequency signal to operating off the second clock frequency signal, the controller monitors the phase alignment of the first clock frequency and the second clock frequency as previously discussed. In one embodiment, the phase alignment (between the first clock frequency and second clock frequency) changes over each of the multiple control cycles until, eventually, the phase of the second clock frequency substantially aligns with the first clock frequency. As further discussed herein, at or around such time of detecting alignment, the controller initiates switchover from the first clock frequency to the second clock frequency.

Accordingly, in one embodiment, the controller transitions the setting of the switching frequency from the first clock frequency to the second clock frequency depending on a phase difference between the first clock frequency with respect to the second clock frequency, the phase difference decreasing in magnitude over multiple switching control cycles until switchover as previously discussed.

In yet further example embodiments, a value (setting) of the first clock frequency is set to a value that is different, but substantially equal to a value (setting) of the second clock frequency. That is, the first clock frequency and the second clock frequency are not equal in magnitude. In one embodiment, the difference in the values of the first clock frequency and the second clock frequency (one frequency being greater than the other) eventually causes the phases of the different clock frequency signals to align, enabling transition as described herein.

In accordance with still further embodiments, the controller sets the first clock frequency signal and the second clock frequency signal to different desired fixed frequency settings just prior to the transition of setting the switching frequency to the second clock frequency signal. More specifically, in one non-limiting example embodiment, the controller adjusts a value (setting) of the first clock frequency to be (an intermediate frequency) within a threshold value (such as 20% percent of point of the first clock frequency or other suitable value) of the second clock frequency in response to detecting a trigger event to set the switching frequency of the power converter back to the second clock frequency.

In yet further example embodiments, as previously discussed, the controller transitions from setting the switching frequency from the first clock frequency to the second clock frequency in response to the controller (or other suitable resource) detecting that a phase of the second clock frequency aligns with a phase of the first clock frequency or that a phase of the first clock frequency aligns with a phase of the second clock frequency.

In still further example embodiments, the second clock frequency is a master clock frequency; the first clock frequency is asynchronous with respect to the master clock frequency.

As previously discussed, embodiments herein are useful over conventional techniques. For example, control of the switching frequency associated with the power converter enables quicker synchronization of operating the power converter off a master clock frequency within a predetermined number of switching control cycles. As further discussed herein, the asynchronous clock frequency signal can be adjusted (such as increased or decreased) to facilitate a faster or slower transition switchover from the temporary clock frequency to the master clock frequency.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: convert an input voltage into an output voltage; select a switching frequency applied to control switching operation of the power converter; and transition a setting of the switching frequency from a first clock frequency signal to a second clock frequency signal depending on detection of phase alignment of the first clock frequency and the second clock frequency.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting switching power supplies. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

An apparatus includes a power converter and a controller. The power converter converts a received input voltage into an output voltage that powers a dynamic load. The controller controls a setting of a switching frequency signal applied to the power converter. During one operational mode, the controller transitions a setting of the switching frequency signal of the power converter from a first clock frequency signal to a second clock frequency signal depending on occurrence of phase alignment of the second clock frequency signal and the first clock frequency signal, which may eventually occur over multiple switching control cycles. Transition of the switching frequency from the first clock frequency signal to the second clock frequency signal at or around a time of the phase alignment reduces possible perturbations in the output voltage as a result of the clock frequency switchover.

Figure 1:
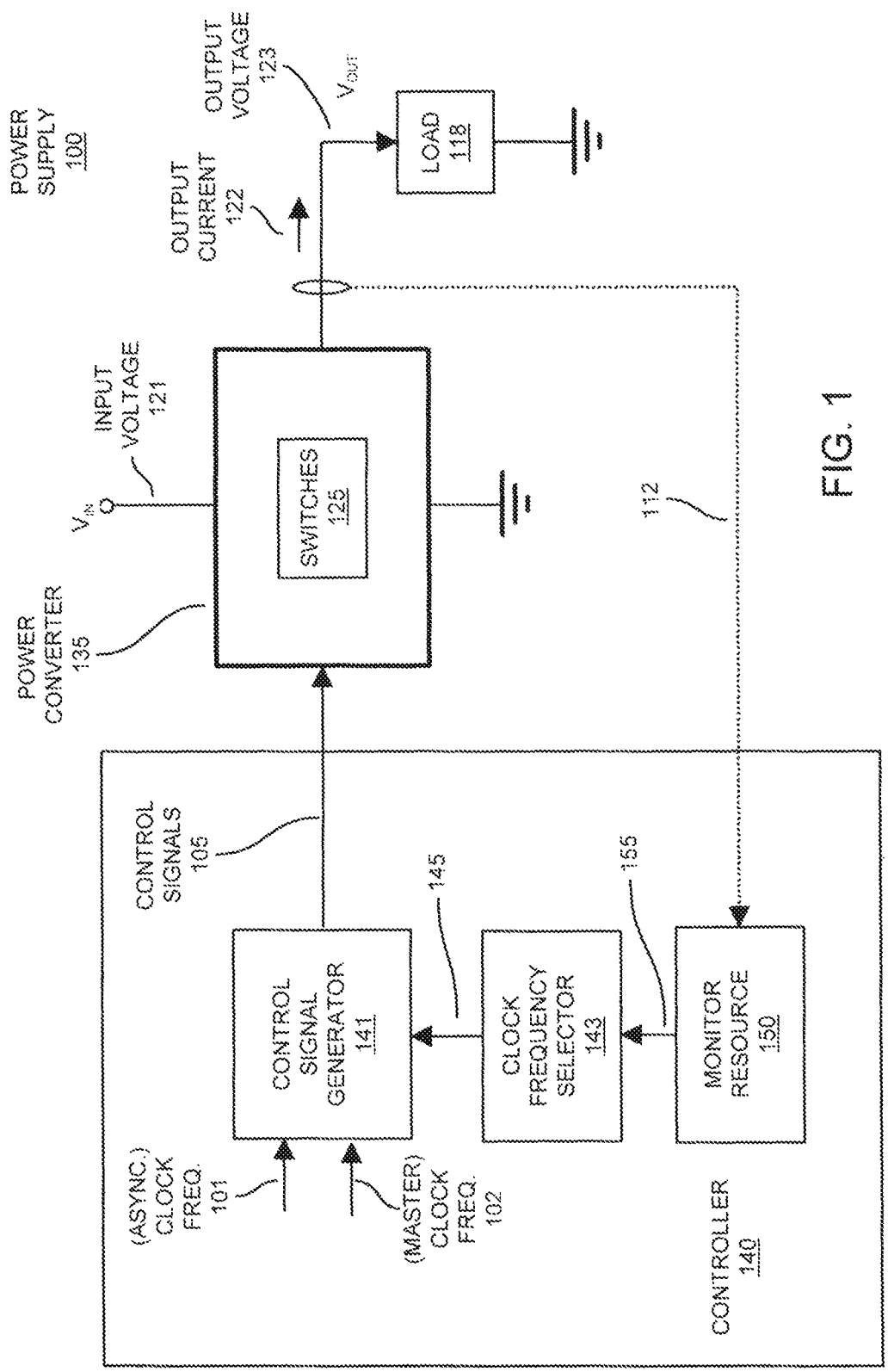
FIG. 1 is an example general diagram of a power supply supporting frequency switchover according to embodiments herein.

Now, more specifically, FIG. 1 is an example general diagram of a power supply and frequency switchover according to embodiments herein.

As shown in this example embodiment, the power supply 100 includes a controller 140, power converter 135, and dynamic load 118.

The controller 140 includes control signal generator 141, clock frequency selector 143, and monitor resource 150. The power converter 135 includes components such as switches 125 and/or other circuitry to convert an input voltage 121 into a respective output voltage 123 that powers the dynamic load 118.

During operation, as its name suggests, the monitor resource 150 monitors, via feedback 112, one or more attributes of the power converter circuit 135 such as magnitude of the input voltage 121, magnitude of the output voltage 123, magnitude of the output current 122, etc.

Based on monitored feedback 112, monitor resource 150 produces and outputs status information 155 indicating settings of the different monitored parameters to the clock frequency selector 143.

Via the status information 155, and as its name suggests, the clock frequency selector 143 associated with the controller 140 produces and outputs frequency selection control signal 145 to the control signal generator 141. In one embodiment, the control signal 145 indicates which of the clock frequency signals (clock frequency signal 101 or clock frequency signal 102) is to be used to generate corresponding control signals 105 applied to control switching operation of the one or more switches 125 in the power converter 135.

As further discussed herein, during one operational mode, the controller 140 transitions the setting of the switching frequency of the power converter 135 from a first clock frequency signal 101 to a second clock frequency signal 102 depending on phase alignment of the first clock frequency signal 101 and the second clock frequency signal 102.

Figure 2:
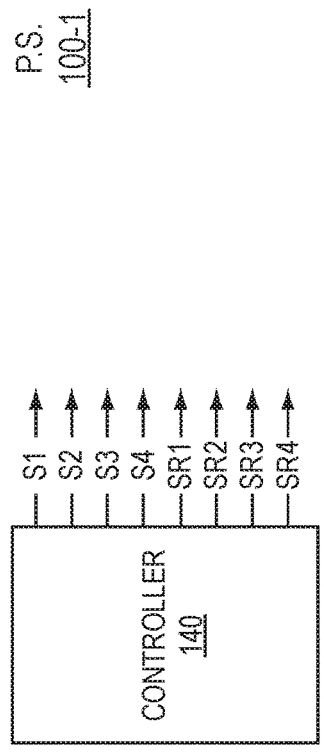
FIG. 2 is an example diagram illustrating a power supply circuit according to embodiments herein.
Figure 2:
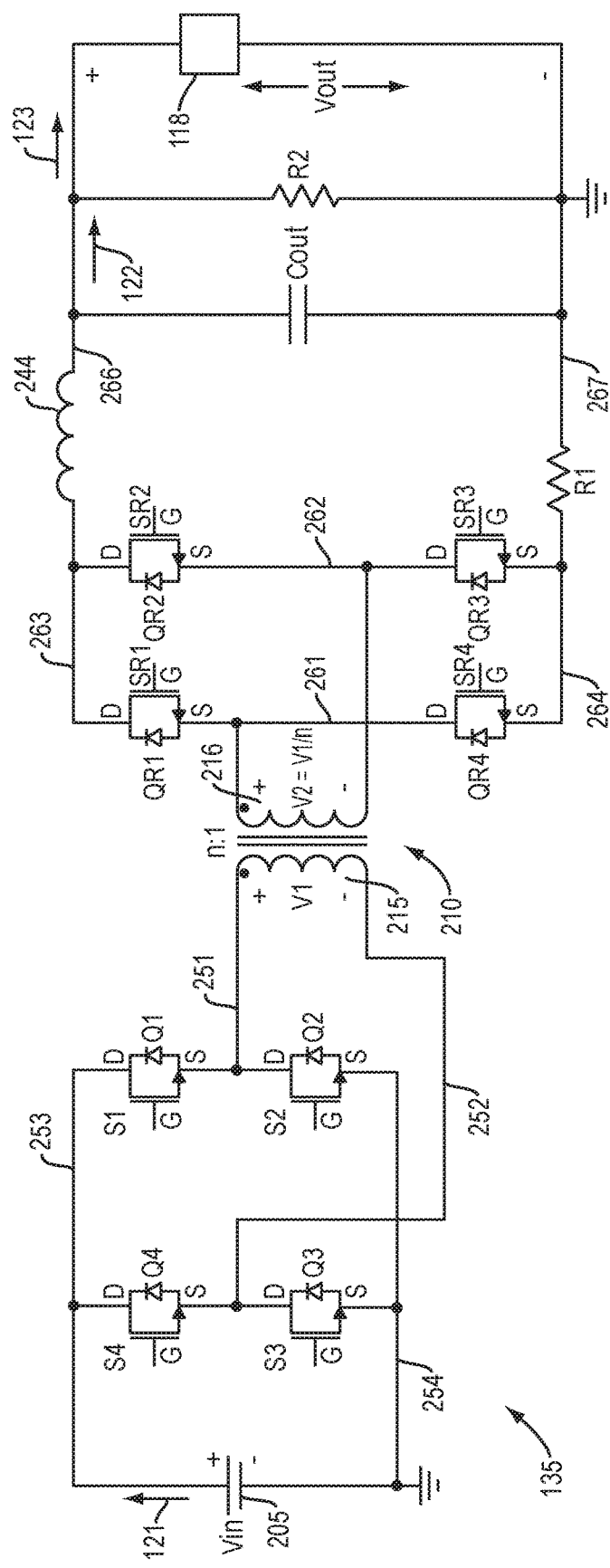

FIG. 2 is an example diagram illustrating a power supply circuit according to embodiments herein.

In this example embodiment, the power converter 135 includes input voltage source 205 (providing input voltage 121), switches 125 (namely, switch Q1, Q2, Q3, Q4, QR1, QR2, QR3, and QR4), transformer 210, inductor 244, capacitor Cout, and resistor R1.

Transformer 210 includes primary winding 215 and secondary winding 216.

As shown, input voltage source 205 supplies input voltage 121 to node 253. Switch Q4 and switch Q3 are connected in series between node 253 and node 254. Switch Q1 and switch Q2 are connected in series between node 253 and node 254. Node 254 is connected to ground reference voltage.

Node 251 provides connectivity between a first node of the primary winding 215 and connection of switches Q1 and Q2. Node 252 provides connectivity between a second node the primary winding 215 and switches Q3 and Q4.

As further shown, switch QR1 and switch QR4 are connected in series between node 263 and node 264. Switch QR2 and switch QR3 are connected in series between node 263 and node 264.

Node 261 provides connectivity between a first node of the secondary winding 216 and connect between switches QR1 and QR4. Node 262 provides connectivity between a second node of the secondary winding 216 and connection between switches QR2 and QR3.

As previously discussed, controller 140 produces control signals 105 including signal S1, signal S2, signal S3, signal S4, signal SR1, signal SR2, signal SR3, and signal SR4 driving respective switches 125. For example, in this example embodiment, control signal S1 controls gate (G) of switch Q1; control signal S2 controls gate (G) of switch Q2; control signal S3 controls gate (G) of switch Q3; control signal S4 controls gate (G) of switch Q4; control signal SR1 controls gate (G) of switch QR1; control signal SR2 controls gate (G) of switch QR2; control signal SR3 controls gate (G) of switch QR3; control signal SR4 controls gate (G) of switch QR4.

Inductor 244 is connected between node 263 and node 266. Output capacitor Cout is connected between node 266 and ground reference voltage 267. Node 266 produces output voltage 123 that powers dynamic load 118.

Figure 3:
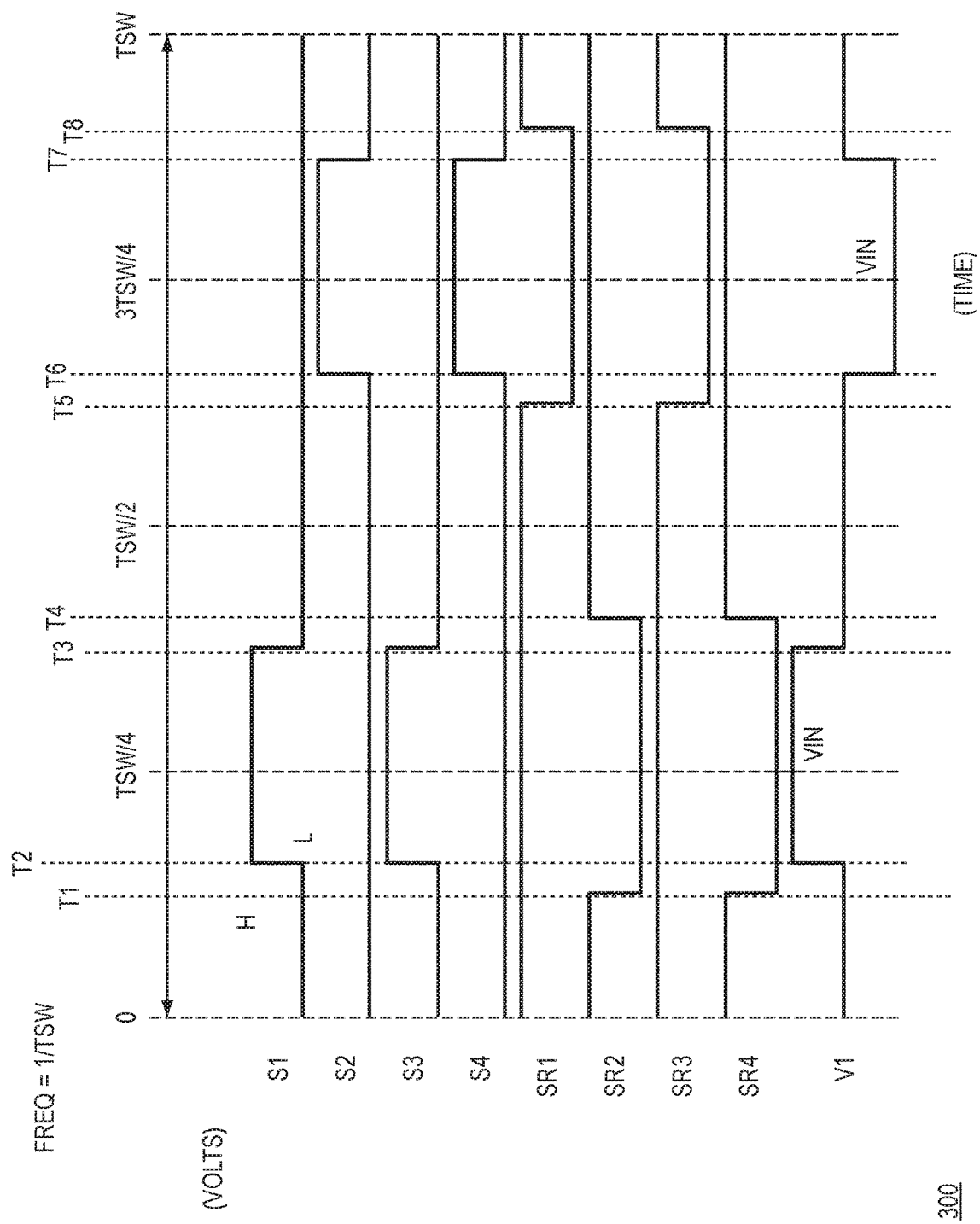
FIG. 3 is an example timing diagram illustrating control signals applied to the power supply of FIG. 2 according to embodiments herein.

FIG. 3 is an example timing diagram illustrating control signals applied to the power supply of FIG. 2 according to embodiments herein.

Timing diagram 300 indicates states of respective control signals driving switches 125.

For example, controller 140 sets the signal S1 to a logic high between time T2 and T3, turning ON respective switch Q1 resulting in a low resistance drain to source switch path; controller 140 sets the signal S2 to a logic high between time T6 and T7, turning ON respective switch Q2 resulting in a low resistance drain to source switch path; controller 140 sets the signal S3 to a logic high between time T2 and T3, turning ON respective switch Q3 resulting in a low resistance drain to source switch path; controller 140 sets the signal S4 to a logic high between time T6 and T7, turning ON respective switch Q4 resulting a low resistance drain to source switch path. Such control signals are otherwise logic low (respective switches are OFF).

Controller 140 sets the signal SR1 to a logic low between time T5 and T8, turning OFF respective switch QR1 resulting in a high resistance drain to source switch path; controller 140 sets the signal SR2 to a logic low between time T1 and T4, turning OFF respective switch QR2 resulting in a high resistance drain to source switch path; controller 140 sets the signal SR3 to a logic low between time T5 and T8, turning OFF respective switch QR3 resulting in a high resistance drain to source switch path; controller 140 sets the signal SR4 to a logic low between time T1 and T4, turning OFF respective switch QR4 resulting in a high resistance drain to source switch path. Such control signals are otherwise logic high (respective switches are ON).

Time duration between time 0 and TSW represents one period of a respective switching control cycle of controlling the power converter 135. The corresponding switching frequency=1/TSW.

Switching of respective switches Q1, Q2, Q3, and Q4 as previously discussed produces voltage V1 at the input of the primary winding 215. Switching of switches QR1, QR2, QR3, and QR4 produces the output voltage 123 (Vout such as a DC voltage).

Figure 4:
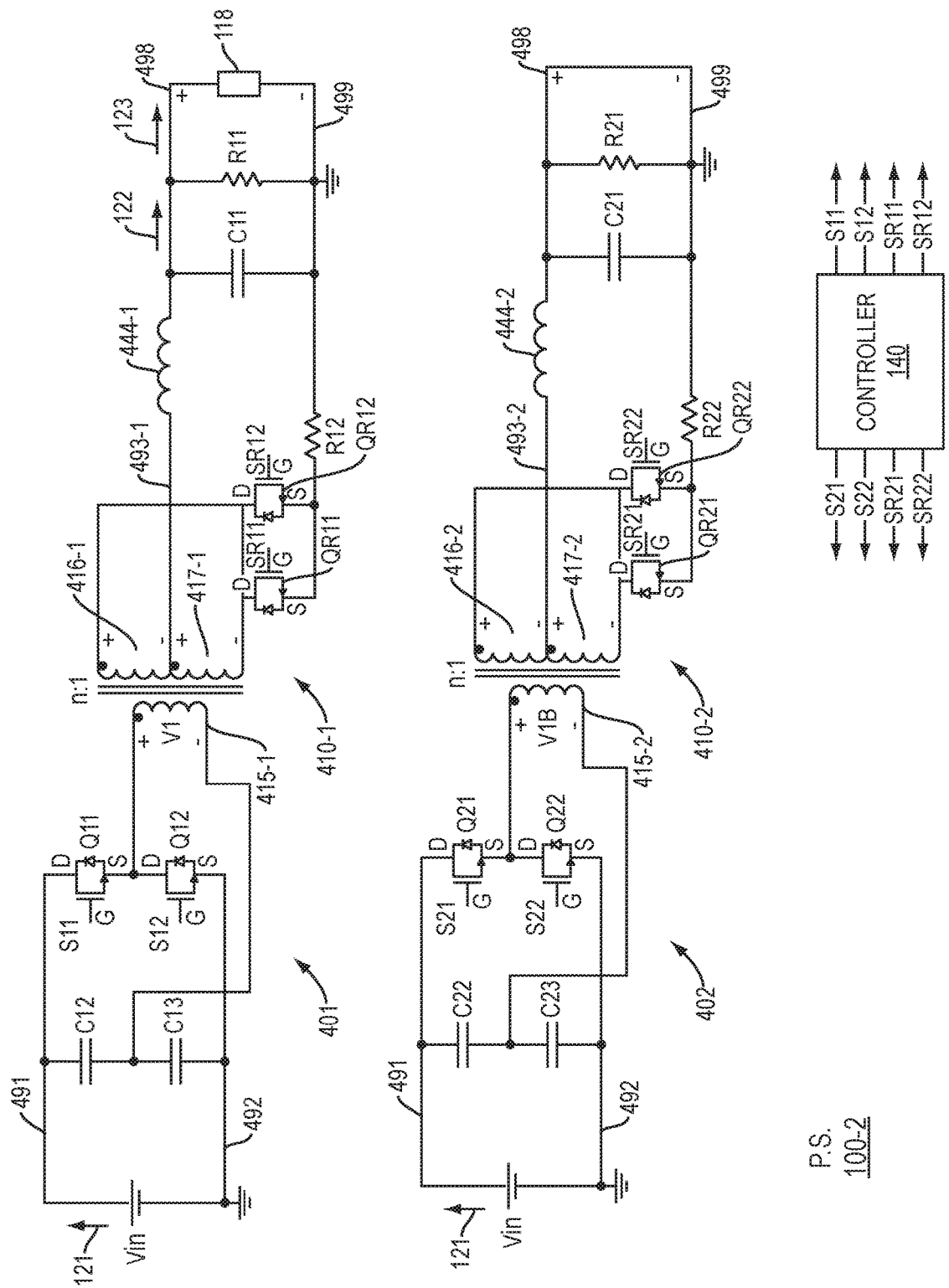
FIG. 4 is an example diagram illustrating a power supply circuit according to embodiments herein.

FIG. 4 is an example diagram illustrating a power supply circuit according to embodiments herein.

In this embodiment, the instantiation of power supply 100-2 include multiple phases such as phase 401 and phase 402. Controller 140 produces signals S11, S12, SR11, and SR12. Controller 140 also produces signals S21, S22, SR21, and SR22.

As shown, transformer 410-1 of phase 410 includes primary winding 416-1 and a secondary winding. The secondary winding is centered tapped to include secondary winding 416-1 and secondary winding 416-2.

Phase 401 further includes: i) series connected capacitors C12 and C13 between the node 491 and node 492, and ii) series connected switches Q11 and Q12 between the node 491 and node 492. A first node of primary winding 415-1 is connected to the node connecting capacitors C12 and C13; a second node of primary winding 415-1 is connected to the node connecting switches Q11 and Q12.

A first node of primary winding 416-1 is connected to the drain node of switch QR12; the source node of switch QR12 is connected to resistor R12. A first node of primary winding 417-1 is connected to the drain node of switch QR11; the source node of switch QR11 is connected to a first node of resistor R12. A second node of resistor R12 is connected to ground node 499. Inductor 444-1 is connected between the node 498 and node coupling secondary winding 416-1 and secondary winding 417-1. Each of the components such as capacitor C11, resistor R11, and load 118 is connected between node 498 and node 499.

Phase 402 further includes: i) series connected capacitors C22 and C23 between the node 491 and node 492, and ii) series connected switches Q21 and Q22 between the node 491 and node 492. A first node of primary winding 415-2 is connected to the node connecting capacitors C22 and C23; a second node of primary winding 415-2 is connected to the node connecting switches Q21 and Q22.

A first node of primary winding 416-2 is connected to the drain node of switch QR22; the source node of switch QR22 is connected to a first node of resistor R22. A first node of primary winding 417-2 is connected to the drain node of switch QR21; the source node of switch QR21 is connected to the first node of resistor R22. A second node of resistor R22 is connected to ground node 499. Inductor 444-2 is connected between the node 498 and node coupling secondary winding 416-2 and secondary winding 417-2. Each of the components such as capacitor C21, resistor R21, and load 118 is connected between node 498 and node 499.

The combination of phases 401 and 402 produce a respective output voltage 123 powering dynamic load 118.

Figure 5:
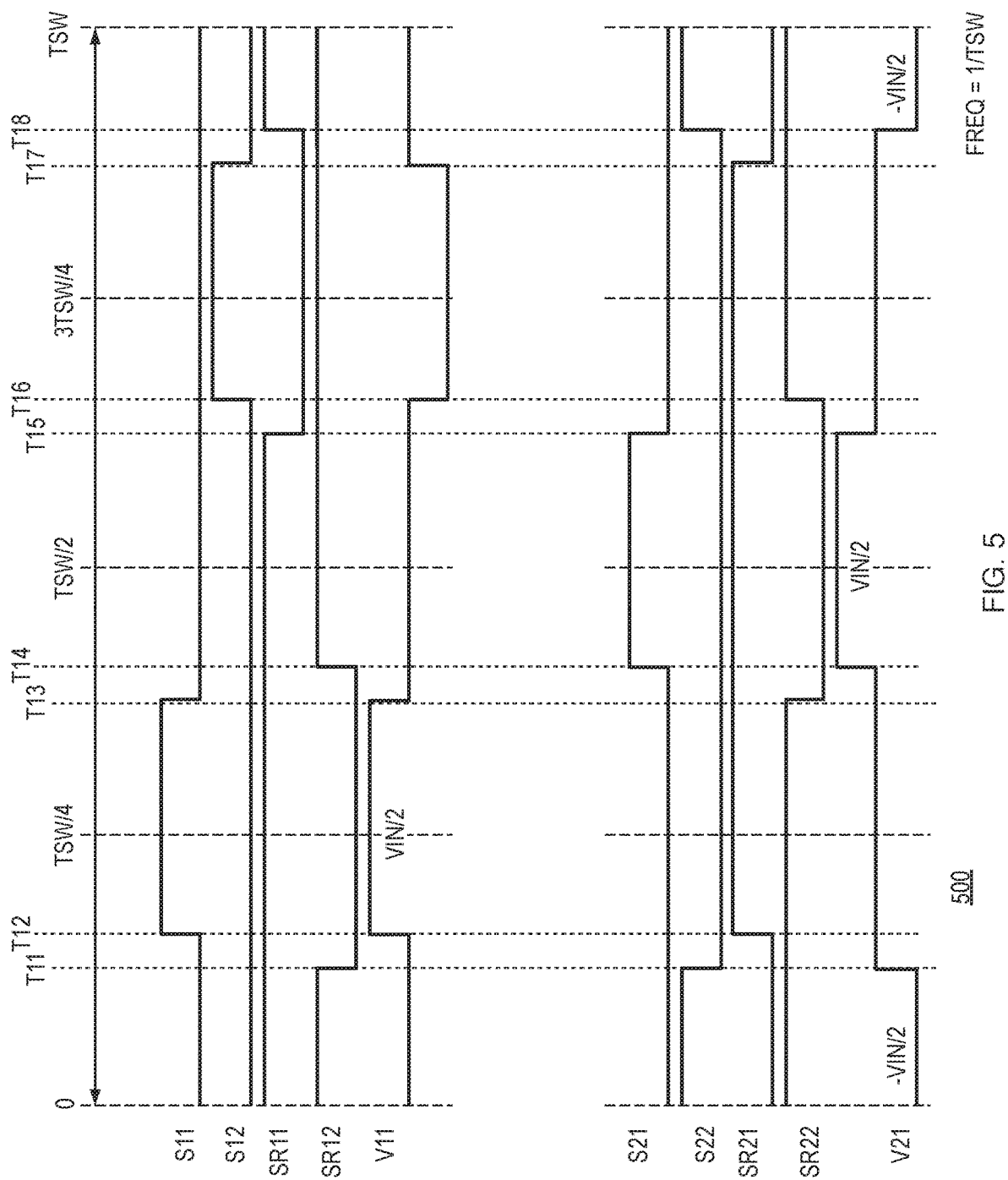
FIG. 5 is an example timing diagram illustrating control signals applied to the power supply of FIG. 4 according to embodiments herein.

FIG. 5 is an example timing diagram illustrating control signals applied to the power supply of FIG. 4 according to embodiments herein.

Timing diagram 500 indicates states of respective control signals driving switches 125.

For example, controller 140 sets the signal S11 to a logic high between time T12 and T13, turning ON respective switch Q11 resulting in a low resistance drain to source switch path; controller 140 sets the signal S12 to a logic high between time T16 and T17, turning ON respective switch Q12 resulting in a low resistance drain to source switch path; controller 140 sets the signal SR11 to a logic low between time T15 and T18, turning OFF respective switch QR11 resulting in a high resistance drain to source switch path; controller 140 sets the signal SR12 to a logic low between time T11 and T14, turning OFF respective switch QR12 resulting in a high resistance drain to source switch path.

Controller 140 sets the signal S21 to a logic high between time T14 and T15, turning ON respective switch QR21 resulting in a low resistance drain to source switch path; controller 140 sets the signal S22 to a logic low between time T11 and T18, turning OFF respective switch QR22 resulting in a high resistance drain to source switch path; controller 140 sets the signal SR21 to a logic high between time T12 and T17, turning ON respective switch QR21 resulting in a low resistance drain to source switch path; controller 140 sets the signal SR22 to a logic low between time T13 and T16, turning OFF respective switch QR22 resulting in a high resistance drain to source switch path.

Time duration between time 0 and TSW represents one period of a respective switching control cycle of controlling the power converter 135. The corresponding switching frequency=1/TSW.

Switching of respective switches Q11, Q12, Q21, Q22, QR11, QR12, QR21, and QR22, as previously discussed produces the output voltage 123 (Vout such as a DC voltage or substantially DC voltage).

Figure 6:
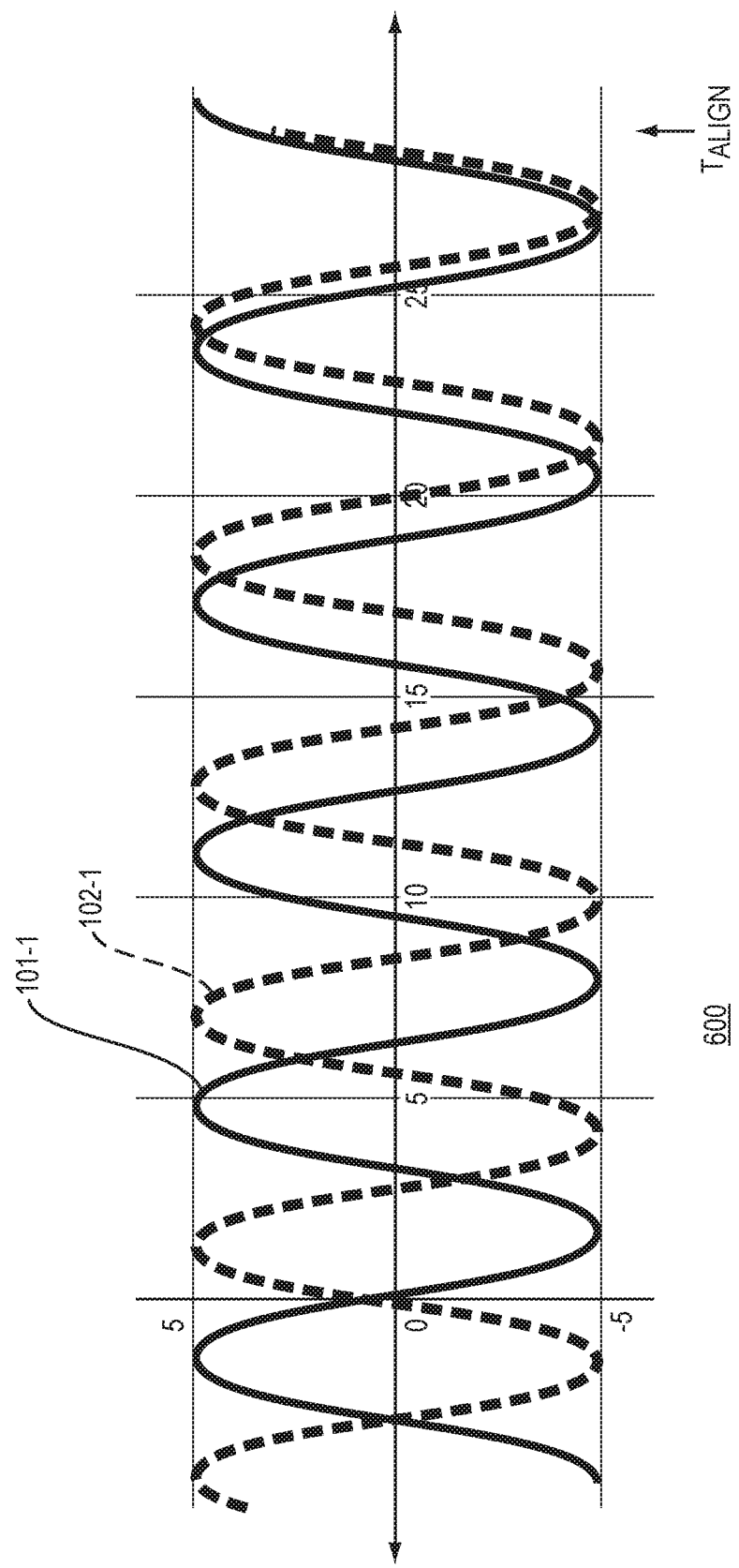
FIG. 6 is an example diagram illustrating eventual phase alignment of a first clock frequency and a second clock frequency signal over multiple cycles according to embodiments herein.

FIG. 6 is an example diagram illustrating eventual phase alignment of a first clock frequency and a second clock frequency signal over multiple cycles according to embodiments herein.

As previously discussed, during one operational mode, the controller 140 transitions the setting of the switching frequency of the power converter 135 from a first clock frequency signal 101-1 to a second clock frequency signal 102-1 depending on phase alignment of the first clock frequency signal 101-1 and the second clock frequency signal 102-1. Timing diagram 600 illustrates how the phase of clock frequency 101-1 and clock frequency 102-1 are initially out of phase for multiple cycles until alignment at time, Talign.

Figure 7:
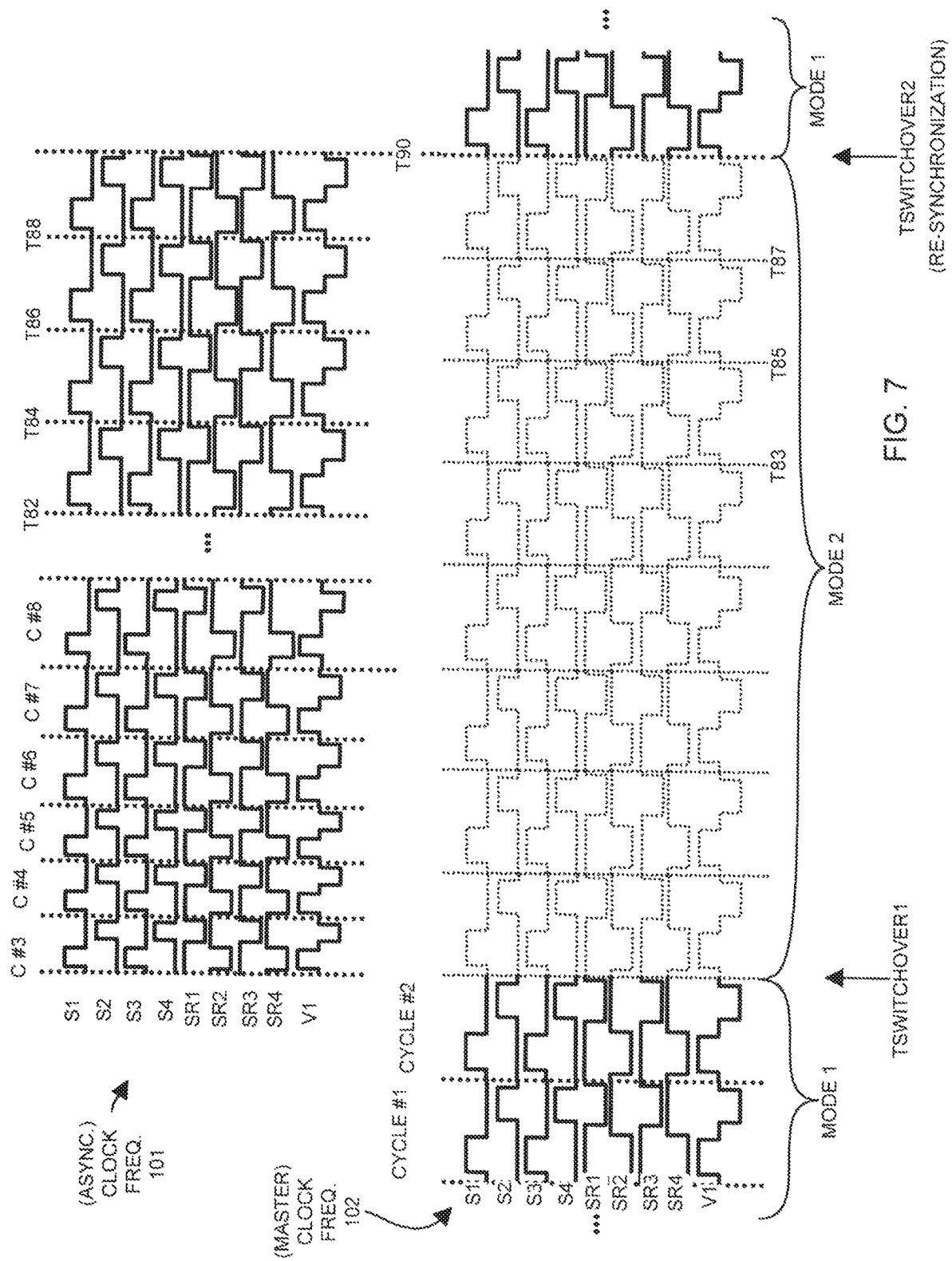
FIG. 7 is an example diagram illustrating switchover from using a master clock frequency signal to an asynchronous clock frequency signal back to the master clock frequency according to embodiments herein.

FIG. 7 is an example diagram illustrating switchover from using a master clock frequency signal to an asynchronous clock frequency signal in response to detecting a transient condition according to embodiments herein.

While in mode #1, the controller 140 produces respective control signals 105 for cycle #1 and cycle #2 based on a master clock frequency signal 102. In one embodiment, the value setting (such as magnitude) of the master clock frequency signal 102 is chosen so that generation of the output voltage 123 does not interfere with electronics powered by the output voltage 123 (and corresponding output current 122).

Prior to time Tswitchover1 (such as cycle #1, cycle #2, the controller 140 use the clock frequency signal 102 to generate corresponding control signals driving the power converter circuit 135. In one embodiment, when the controller 140 commits to switching from a transient response (TR) mode/discontinuous conduction mode (DCM) frequency (first frequency 101) to standard frequency (second frequency 102), such as from mode #2 to mode #1, the controller 140 implements an intermediate frequency, which the controller 140 chooses so that phase alignment occurs in a few switching cycles. For example, as further discussed below in FIG. 8, in one embodiment, the controller 140 sets the first clock frequency signal 101 and the second clock frequency signal 102 to different desired fixed frequency settings just prior to the transition of setting the switching frequency to the second clock frequency signal. In yet further example embodiments, the controller 140 can be configured to adjust a value of the first clock frequency signal 101 (such as an intermediate frequency) to be within a threshold value (such as 20% percent of point of the first clock frequency or other suitable value) of the second clock frequency signal 102 in response to detecting a trigger event (notification from clock frequency selector 143) to set the switching frequency of the power converter 135 back to the second clock frequency signal 102.

At or around time Tswitchover1, assume that the monitor resource 150 detects a change in magnitude of the output voltage 123 and/or the output current 122 due to a transient consumption condition associated with the dynamic load 118. To maintain the output voltage 123 within a desired voltage range, and provide continued voltage regulation, the controller 140 switches over to operating the power converter 135 via a higher switching frequency signal 101 during mode #2 (such as cycle #3, cycle #4, cycle #5, etc.).

In mode #2, the controller 140 controls one or more parameters such as a frequency setting of the controls signals 125, pulse width of control signals 125, etc., to maintain the output voltage 123 in a desired range. As previously discussed, it may be less desirable to operate off a different frequency than the master clock frequency 102. However, switching over to the clock frequency signal 101 ensures that the magnitude of the output voltage 123 is maintained within an appropriate voltage range.

Thus, in response to detecting a condition such as a change in an amount of current consumed by a load 118, variation in a magnitude of the output voltage 123, or any other power supply condition, the controller 140 temporarily sets the switching frequency signal applied to the power converter to the first clock frequency signal 101 (such as a higher frequency operation that is needed) to maintain regulation of the output voltage 123 within a desired range due to a transient condition. Thus, one embodiment herein includes the controller 140 switching (at time Tswitchover 1) from setting the switching frequency from the second clock frequency signal 102 to the first clock frequency signal 101 in response to detecting a substantial change in current consumption by the dynamic load.

Eventually, after a transient load condition is over (normal current consumption), such as determined via monitoring of the output voltage 123 and/or output current 122 using monitor resource 150, the controller 150 switches back to operating in mode #1 at time Tswitchover2. However, as shown, the transition from operating off the first clock frequency signal 101 to operating off the second clock frequency signal 102 occurs depending on alignment of the first clock frequency signal 101 and the second clock frequency signal 102 as further discussed below.

In other words, as further discussed below, the decision to switchover to the second clock frequency 102 occurs at or around time 82. However, the transition from the clock frequency signal 101 to the clock frequency signal 102 does not occur until time T90 when the phases are substantially aligned.

Thus, FIG. 7 illustrates how the switching frequency of operating the power converter circuit 135 becomes temporarily asynchronous with respect to the master clock frequency signal 102 during mode #2. However, re-synchronization of operating the power converter circuit 135 to the master clock frequency signal 102 eventually occurs upon detection of phase alignment as further discussed below.

Figure 8:
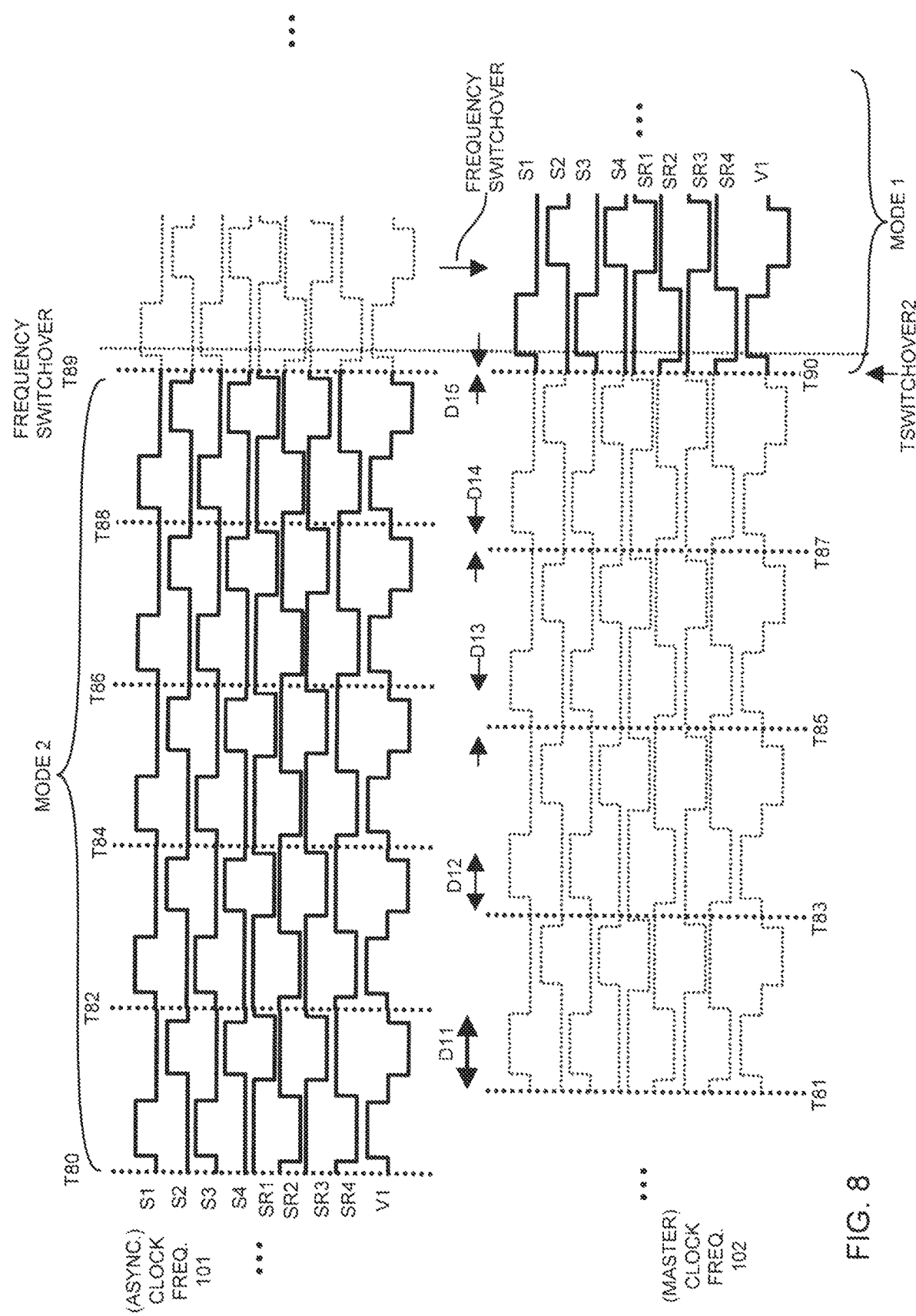
FIG. 8 is an example diagram illustrating eventual phase alignment of a first clock frequency signal (fixed asynchronous frequency) and a second clock frequency signal (fixed master frequency) over multiple cycles and corresponding switchover according to embodiments herein.

FIG. 8 is an example diagram illustrating eventual phase alignment of a first clock frequency signal (fixed asynchronous frequency) and a second clock frequency signal (fixed master frequency) over multiple cycles and corresponding switchover according to embodiments herein.

As previously discussed, in one embodiment, subsequent to addressing (providing sufficient current to accommodate) the transient load condition, assume that the first clock frequency signal 101 (measured via the control cycle between T80 and T82, control cycle between T82 and T84, control cycle between T84 and T86, control cycle between T86 and T88, etc.) and the second clock frequency signal 102 (measured via the control cycle between T81 and T83, control cycle between T83 and T85, control cycle between T85 and T87, control cycle between T87 and T89, etc.) are not aligned. For example, as shown, for several clock cycles before time Tswitchover, the clock frequency signal 101 and clock frequency signal 102 are out of phase with respect to each other.

However, because the first clock frequency signal 101 and the second clock frequency signal 102 are different in magnitude (such as because the clock frequency signal 101 is set to a higher frequency than the master clock frequency signal 102, eventually the first clock frequency signal 101 and the second clock frequency signal 102 align over multiple switching control cycles at time Tswitchover2 (around time T89 and T90).

Recall again that the second clock frequency is a master clock frequency signal 102 synchronized to an external clock source; the first clock frequency signal 101 is asynchronous with respect to the master clock frequency to accommodate transient control. Operation of the power converter 135 at the higher switching frequency (variable clock frequency signal 101) increases a responsiveness of the power converter 135 to maintain the output voltage 123 in regulation during transient current consumption conditions. Additionally, in certain instances, the controller 140 varies a value of the first clock frequency signal 101 as well as corresponding pulse width modulation signals applied to the power converter 135 (over any frequency control signals) to maintain a magnitude of the output voltage 123 within a desired operational range.

Assume that the frequency selection control signal 145 from the clock frequency selector 143 indicates to switchover at around time T80 or T81. As previously discussed, the controller 140 does not initially switch to (re-synchronize) operating the power converter 135 and producing respective control signals 105 based on the master clock frequency signal 102 until time Tswitchover2 when the phase of the clock frequency signal 102 aligns substantially, as shown, with the phase of the clock frequency signal 101.

In one embodiment, the controller 140 sets the first clock frequency signal 101 and the second clock frequency signal 102 to different desired fixed frequency settings just prior to the transition of setting the switching frequency to the second clock frequency signal. For example, the controller 140 can be configured to adjust a value of the first clock frequency signal 101 (such as an intermediate frequency) to be within a threshold value (such as 20% percent of point of the first clock frequency or other suitable value) of the second clock frequency signal 102 in response to detecting a trigger event (notification from clock frequency selector 143) to set the switching frequency of the power converter 135 back to the second clock frequency signal 102.

In one embodiment, the controller 140 sets a value (i.e. magnitude) of the first clock frequency signal 101 to a value that is different, but substantially equal to but greater in value than a value of the master clock frequency signal 102. That is, the clock frequency signal 101 and the (fixed) master clock frequency signal 102 are not equal in value (magnitude) during mode #2. The difference in the values of the first clock frequency signal 101 and the master clock frequency signal 102 (one frequency being greater than the other) eventually causes the phases of these different clock frequency signals to align, enabling transition as described herein.

More specifically, time duration D11 illustrates an amount by which the clock frequency signal 102 is out of phase with respect to clock frequency signal 101 around time T81 and time T82. Time duration D12 illustrates an amount by which the clock frequency signal 102 is out of phase with respect to clock frequency signal 101 around time T83 and time T84. Time duration D13 illustrates an amount by which the clock frequency signal 102 is out of phase with respect to clock frequency signal 101 around time T85 and time T86. Time duration D14 illustrates an amount by which the clock frequency signal 102 is out of phase with respect to clock frequency signal 101 around time T87 and time T88. Time duration D15 illustrates an amount by which the clock frequency signal 102 is out of phase with respect to clock frequency signal 101 around time T89 and time T90.

Thus, the phase difference between the second clock frequency signal 102 and the first clock frequency signal 101 decreases over multiple switching control cycles until eventual alignment.

The transition of the switching frequency from using the first frequency signal 101 to the second frequency signal 102 at or around the time of alignment (Tswitchover2) substantially reduces or prevents perturbations in the output voltage 123 (and/or disturbance to the circuit) as a result of the clock frequency transition. In other words, initiating switchover from the first clock frequency signal 101 to the second clock frequency signal 102 at time Tswitchover provides a smoother control transition.

As previously discussed, in one embodiment, the second clock frequency signal 102 is a predetermined fixed (master) frequency that does not change because it synchronized with a corresponding circuit and/or one or more remote clocks. Thus, even though the controller 140 may initiate a switchover at time T82 in FIG. 7, the control continues to track timing of the master clock frequency signal 102 for subsequent switchover at time Tswitchover2. In a manner as previously discussed, the controller 140 transitions from setting the switching frequency from the first clock frequency to the second clock frequency in response to the controller (or other suitable resource) detecting that a phase of the second clock frequency signal 102 substantially aligns with a phase of the first clock frequency 101 or in response to detecting that a phase of the first clock frequency signal 101 substantially aligns with a phase of the second clock frequency signal 102.

Figure 9:
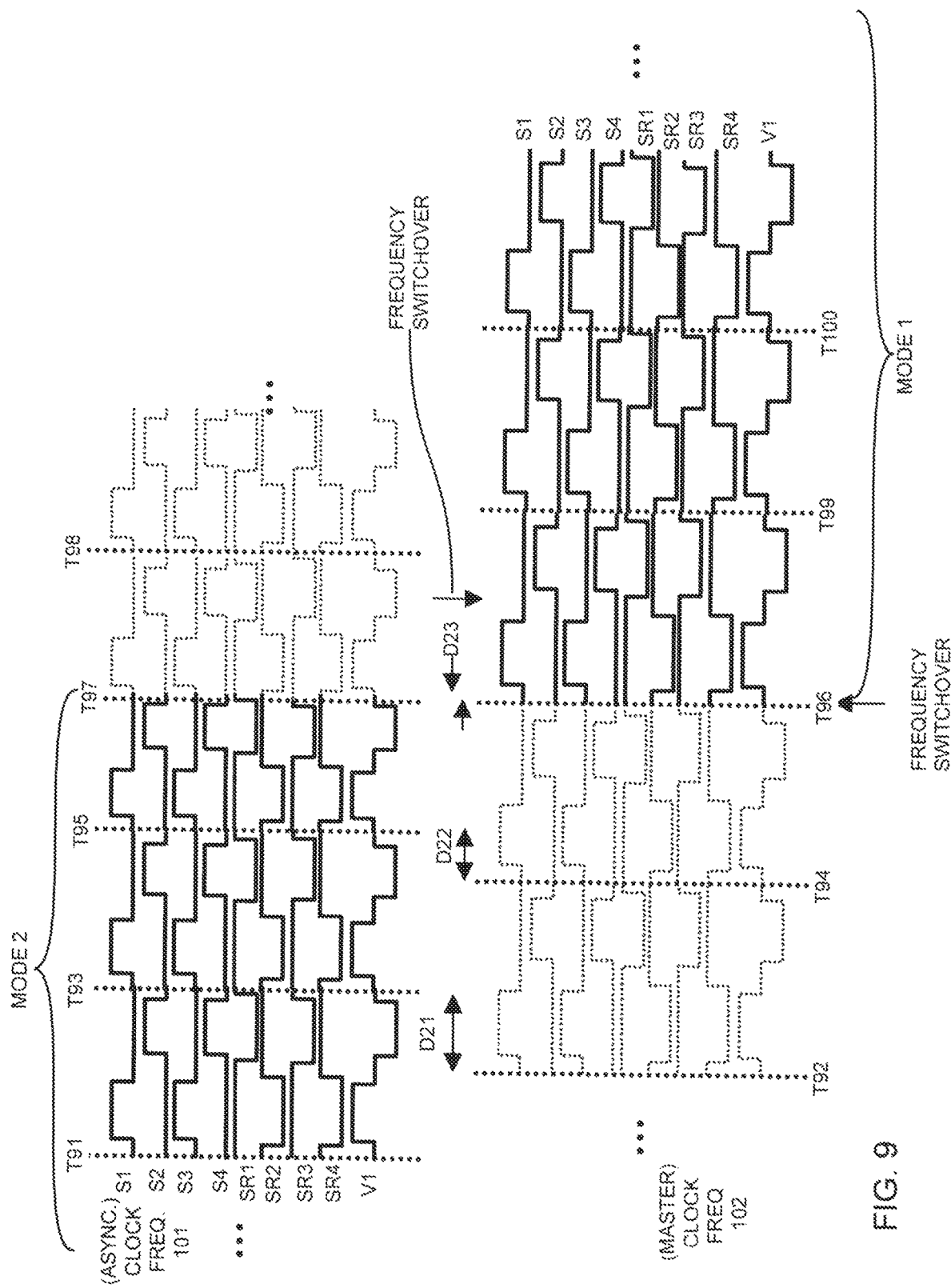
FIG. 9 is an example diagram illustrating eventual phase alignment of a first clock frequency signal (asynchronous frequency increasing in magnitude) and a second clock frequency signal (fixed master frequency) over multiple cycles and corresponding control frequency switchover according to embodiments herein.

FIG. 9 is an example diagram illustrating eventual phase alignment of a first clock frequency signal (asynchronous frequency increasing in value) and a second clock frequency signal (fixed master frequency) over multiple cycles and corresponding control frequency switchover according to embodiments herein.

In one embodiment, as shown in FIG. 9, the controller 140 adjusts a frequency value of the first clock frequency signal 101 over multiple control cycles such as between time T91 and time T98.

More specifically, in a manner as previously discussed, time duration D21 illustrates an amount by which the clock frequency signal 102 is out of phase with respect to clock frequency signal 101 around time T92 and time T93. Time duration D22 illustrates an amount by which the clock frequency signal 102 is out of phase with respect to clock frequency signal 101 around time T94 and time T95. Time duration D23 illustrates an amount by which the clock frequency signal 102 is out of phase with respect to clock frequency signal 101 around time T96 and time T97.

In one embodiment, because the first clock frequency signal 101 and clock frequency signal 102 are substantially aligned at or around time T96 and T97, the controller 140 switches over to using the master clock frequency signal 102 to generate the controls signals 105 that control the power converter 135.

Thus, via adjustment of the clock frequency signal 101, the phase difference between the second clock frequency signal 102 and the first clock frequency signal 101 more quickly decreases over multiple switching control cycles. The transition of the switching frequency from the first frequency signal 101 to the second frequency signal 102 at or around the time of alignment substantially reduces or prevents perturbations in the output voltage 123 (and/or disturbance to the circuit) as a result of the clock frequency transition. In other words, initiating switchover from the first clock frequency signal 101 to the second clock frequency signal 102 at time Tswitchover provides a smoother control transition.

Thus, embodiments herein include, in addition to the controller 140 adjusting a clock frequency of the first clock frequency signal 101, the controller 140 transitions the setting of the switching frequency from the first clock frequency signal 101 to the master clock frequency signal 102 depending on detection of a phase difference between the first clock frequency signal 101 with respect to the master clock frequency signal 102; the phase difference decreases in magnitude over multiple switching control cycles until switchover as previously discussed.

Figure 10:
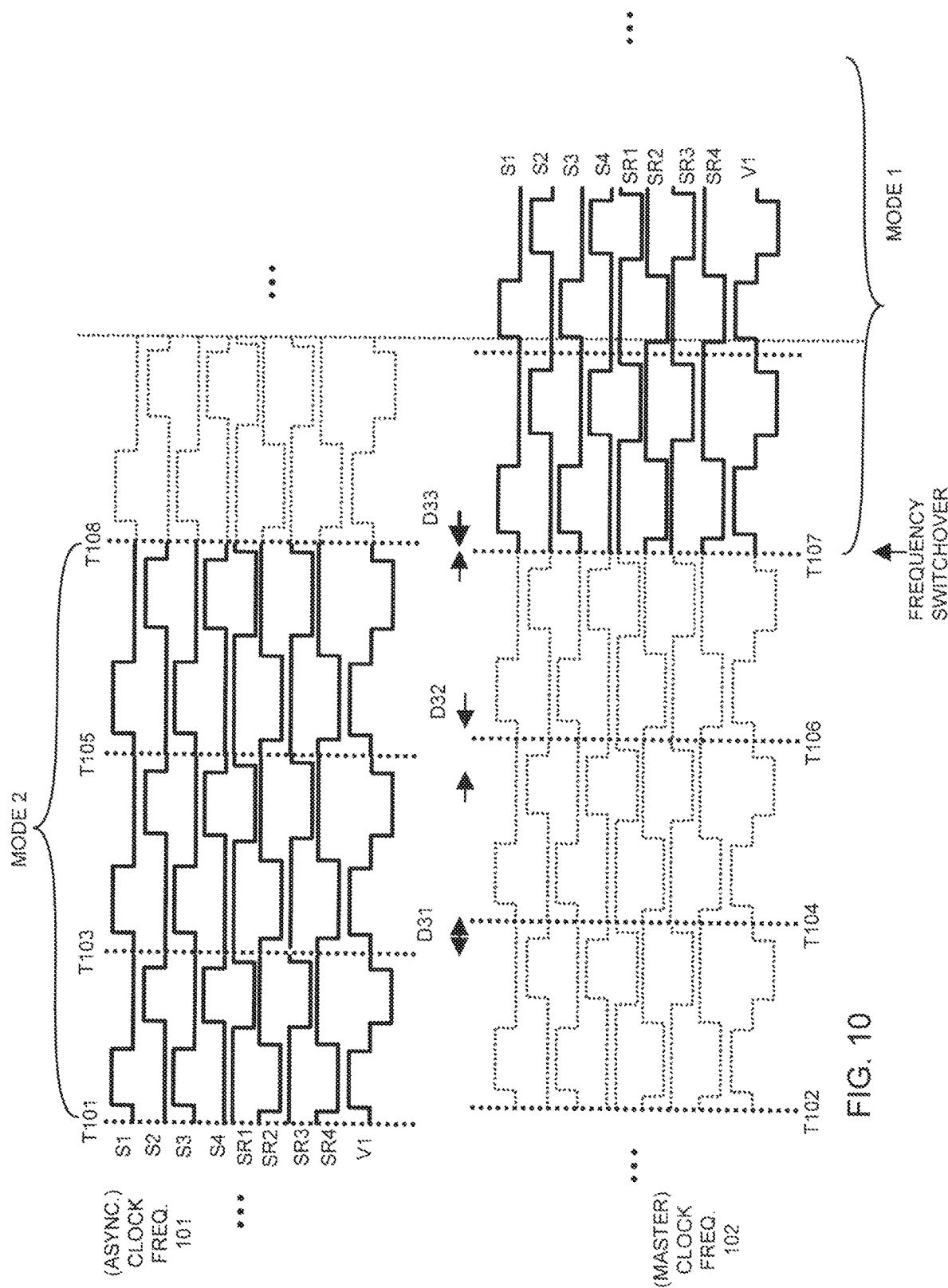
FIG. 10 is an example diagram illustrating eventual phase alignment of a first clock frequency signal (asynchronous frequency decreasing in magnitude) and a second clock frequency signal (fixed master frequency) over multiple cycles and corresponding control frequency switchover according to embodiments herein.

FIG. 10 is an example diagram illustrating eventual phase alignment of a first clock frequency signal (asynchronous frequency decreasing in value) and a second clock frequency signal (fixed master frequency) over multiple cycles and corresponding control frequency switchover according to embodiments herein.

In one embodiment, as shown in FIG. 10, the controller 140 adjusts a frequency value of the first clock frequency signal 101 over multiple control cycles such as between time T101 and time T108.

Time duration D31 illustrates an amount by which the clock frequency signal 102 is out of phase with respect to clock frequency signal 101 around time T103 and time T104. Time duration D32 illustrates an amount by which the clock frequency signal 102 is out of phase with respect to clock frequency signal 101 around time T105 and time T106. Time duration D33 illustrates an amount by which the clock frequency signal 102 is out of phase with respect to clock frequency signal 101 around time T107 and time T108.

In one embodiment, because the first clock frequency signal 101 and clock frequency signal 102 are substantially aligned at or around time T107 and T108, the controller 140 switches over to using the master clock frequency signal 102 to generate the controls signals 105 that control the power converter 135.

Thus, via reducing the frequency of the clock frequency signal 101 over time, the phase difference between the second clock frequency signal 102 and the first clock frequency signal 101 more quickly decreases over multiple switching control cycles, resulting quicker alignment.

Figure 11:
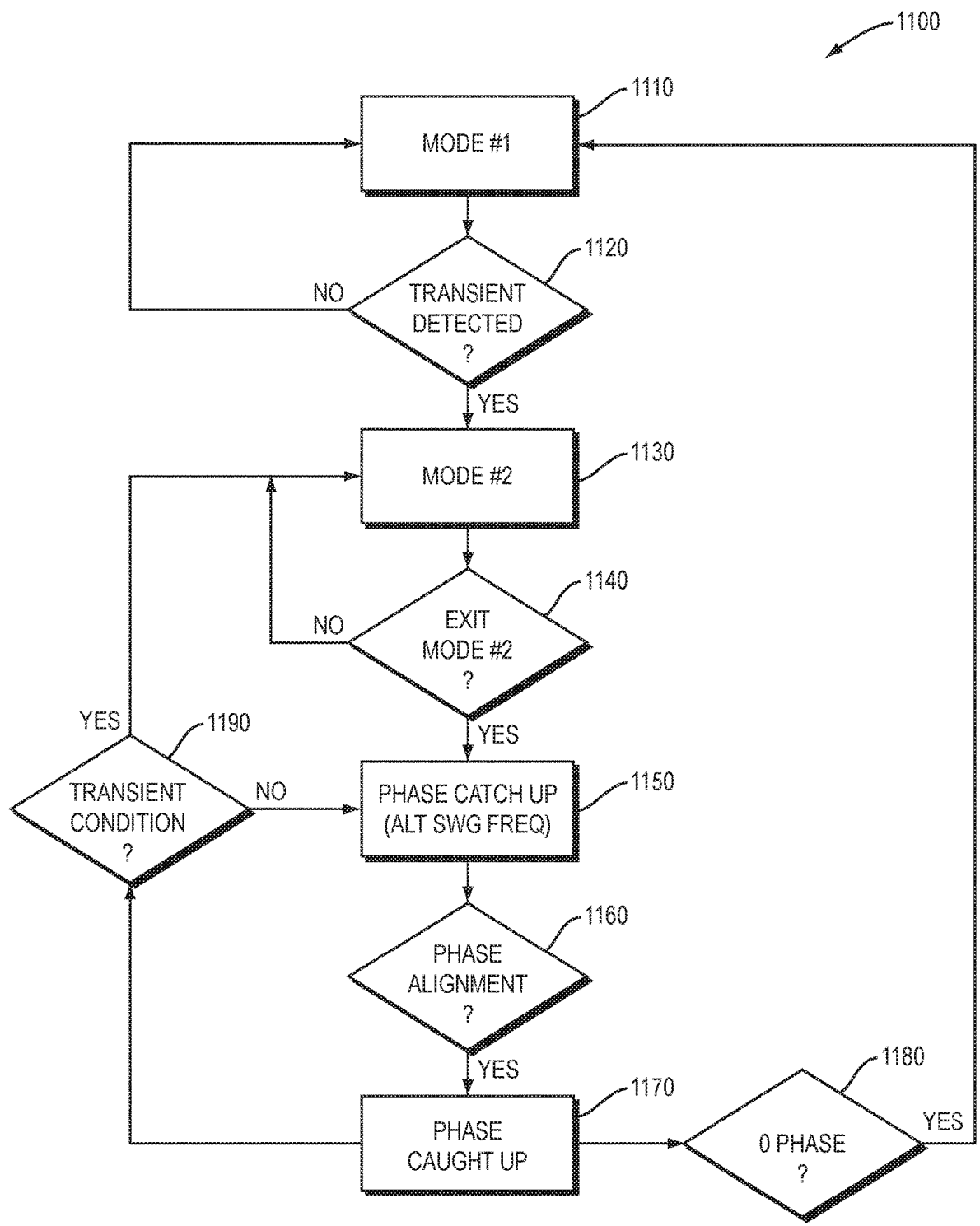
FIG. 11 is an example diagram illustrating a method of controlling frequency switchover according to embodiments herein.

FIG. 11 is an example diagram illustrating a method of controlling frequency switchover according to embodiments herein.

Flowchart 1100 illustrates initial operation 1110 of the power converter 135 in the mode #1 based on the master clock frequency signal 102.

In processing operation 1120, the controller 140 determines whether a transient current consumption condition occurs via a change in the dynamic load 118. If not processing continues in operation 1110. If so, operation continues at processing operation 1130.

In processing operation 1130, the controller 140 operates in mode #2 as previously discussed.

In processing operation 1140, the controller 140 determines if it can discontinue operating the power converter 135 in mode #2 using the first clock frequency signal 101. If not, processing continues at processing operation 1130. If so, the controller executes processing operation 1150 in which the controller 140 monitors for phase alignment in a manner as previously discussed. If the transient current consumption still exists in processing operation 1190, the controller 140 stays in mode #2.

In processing operation 1160, the controller 140 determines if the phases align in a manner as previously discussed. If so, and the controller 140 detects phase alignment in processing operation 1170 and processing operation 1180 (and there is no longer a transient current consumption condition), the controller 140 continues execution at processing operation 1110.

Figure 12:
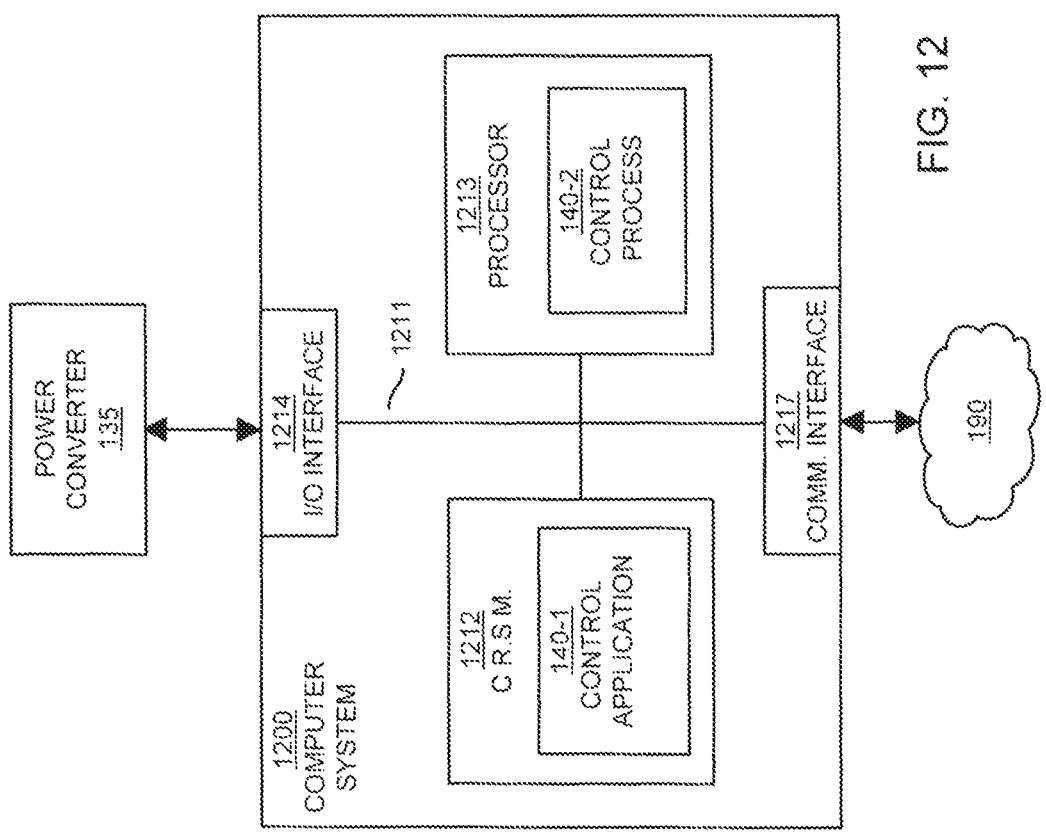
FIG. 12 is an example diagram illustrating computer processor hardware and related software instructions to execute methods according to embodiments herein.

FIG. 12 is an example block diagram of a computer device for implementing any of the operations as discussed herein according to embodiments herein.

As shown, computer system 1200 (such as implemented by any of one or more resources such as controller 140, control signal generator 141, clock frequency selector 143, monitor resource 150, etc.) of the present example includes an interconnect 1211 that couples computer readable storage media 1212 such as a non-transitory type of media (or hardware storage media) in which digital information can be stored and retrieved, a processor 1213 (e.g., computer processor hardware such as one or more processor devices), I/O interface 1214, and a communications interface 1217.

I/O interface 1214 provides connectivity to any suitable circuitry such as power converter circuit 135.

Computer readable storage medium 1212 can be any hardware storage resource or device such as memory, optical storage, hard drive, floppy disk, etc. In one embodiment, the computer readable storage medium 1212 stores instructions and/or data used by the control application 140-1 to perform any of the operations as described herein.

Further in this example embodiment, communications interface 1217 enables the computer system 1200 and processor 1213 to communicate over a resource such as network 190 to retrieve information from remote sources and communicate with other computers.

As shown, computer readable storage media 1212 is encoded with control application 140-1 (e.g., software, firmware, etc.) executed by processor 1213. Control application 140-1 can be configured to include instructions to implement any of the operations as discussed herein.

During operation of one embodiment, processor 1213 accesses computer readable storage media 1212 via the use of interconnect 1211 in order to launch, run, execute, interpret or otherwise perform the instructions in control application 140-1 stored on computer readable storage medium 1212.

Execution of the control application 140-1 produces processing functionality such as control process 140-2 in processor 1213. In other words, the control process 140-2 associated with processor 1213 represents one or more aspects of executing control application 140-1 within or upon the processor 1213 in the computer system 1200.

In accordance with different embodiments, note that computer system 1200 can be a micro-controller device, logic, hardware processor, hybrid analog/digital circuitry, etc., configured to control a power supply and perform any of the operations as described herein.

Functionality supported by the different resources will now be discussed via flowchart in FIG. 13. Note that the steps in the flowcharts below can be executed in any suitable order.

Figure 13:
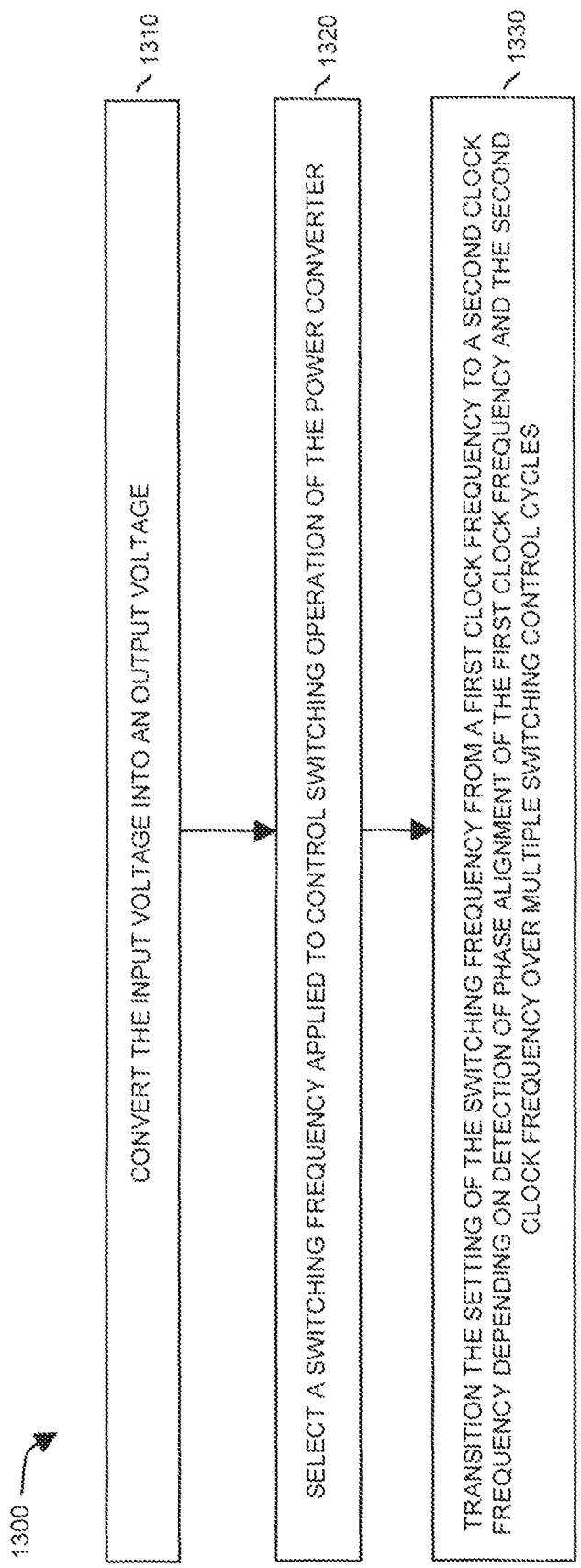
FIG. 13 is an example diagram illustrating a method according to embodiments herein.

FIG. 13 is an example diagram illustrating a method of controlling a power converter according to embodiments herein.

In processing operation 1310, the power converter 135 converts the input voltage 121 into an output voltage 123.

In processing operation 1320, the controller 140 selects a switching frequency signal applied to control switching operation of the power converter 135.

In processing operation 1330, the controller 140 transitions a setting of the switching frequency of the power converter 135 from a first clock frequency signal 101 to a second clock frequency signal 102 (such as re-synchronization) depending on phase alignment.

In one embodiment, FIG. 13 illustrates a transition from a non-standard frequency (such as operating off clock frequency signal 1010 to a standard frequency (such as clock frequency signal 102). As previously discussed, the controller 140 and related resources initiate the transition when switching from a Transient Response (TR) mode or Discontinuous conduction mode (DCM) to a normal mode.

Further, as previously discussed with respect to FIG. 7, switching from operating in mode #1 to mode #2 at time Tswitchover 1 is more abrupt to ensure that the output voltage stays within regulation. In other words, switchover is instantaneous. This is because the controller 140 has control of the phase of the non-standard frequency clock (clock frequency signal 101) and selects an exact phase needed to accommodate the detected transient condition.

Thus, there is this asymmetry in switching from different modes. For example, transitioning from standard mode #1 to non-standard mode #2 is fast or immediate; transitioning from non-standard mode #2 to standard mode 1 depends on the phase alignment of the clocks (which may require multiple clock cycles) as previously discussed. In one embodiment, as previously discussed, this is because the clock frequency signal 102 is set to a fixed frequency and their no control over its phases.

Figure 14:
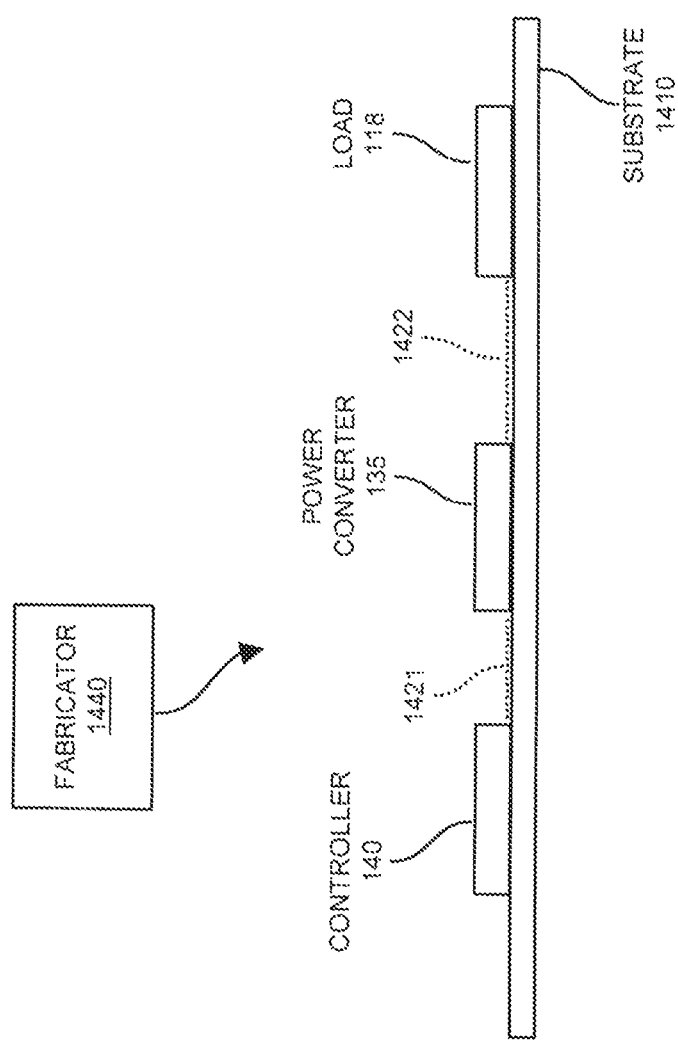
FIG. 14 is an example diagram illustrating fabrication of a circuit according to embodiments herein.

FIG. 14 is an example diagram illustrating fabrication of a power converter circuit on a circuit board according to embodiments herein.

In this example embodiment, fabricator 1440 receives a substrate 1410 (such as a circuit board).

The fabricator 1440 further affixes the controller 140 and power converter 135 (and corresponding components) to the substrate 1410. Via circuit paths 1421 (such as one or more traces, etc.), the fabricator 1440 couples the controller 140 to the power converter 135.

Via one or more circuit paths 1422 (such as one or more traces, etc.), the fabricator 1440 couples the power converter 135 to the load 128. In one embodiment, the circuit path 1422 conveys the output voltage 123 generated from the power converter 100 to the load 118.

Accordingly, embodiments herein include a system comprising: a substrate 1410 (such as a circuit board, standalone board, mother board, standalone board destined to be coupled to a mother board, etc.); a power converter 135 including corresponding components as described herein; and a load 118. As previously discussed, the load 118 is powered based on conveyance of output voltage 123 and corresponding current 132 conveyed over one or more circuit paths 1422 from the power converter 100 to the load 118.

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1410 or disposed at a remote location.

Note again that techniques herein are well suited for use in circuit applications such as those that implement power conversion. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
 a power converter to convert an input voltage into an output voltage;
 a controller operative to: i) control a setting of a switching frequency applied to control switching operation of the power converter, and ii) transition a setting of the switching frequency from a first clock frequency signal to a second clock frequency signal in response to detected phase alignment of the first clock frequency signal and the second clock frequency signal;
 wherein a phase difference between the first clock frequency signal and the second clock frequency signal decreases for multiple cycles just prior to the transition; and
 wherein the phase difference between the first clock frequency signal and the second clock frequency signal increases for multiple cycles just after the transition.

2. The apparatus as in claim 1, wherein the controller is operative to monitor the phase alignment of the first clock frequency signal and the second clock frequency signal, the phase alignment changing over each of multiple control cycles of controlling the switching frequency.

3. The apparatus as in claim 1, wherein the first clock frequency signal is different, but substantially equal to the second clock frequency signal.

4. The apparatus as in claim 1, wherein the first clock frequency signal and the second clock frequency signal are each set to a different fixed frequency setting for the multiple switching control cycles just prior to the transition of setting the switching frequency to the second clock frequency signal.

5. The apparatus as in claim 1, wherein the transition from setting the switching frequency from the first clock frequency signal to the second clock frequency signal occurs in response to the controller detecting that a phase of the second clock frequency signal aligns with a phase of the first clock frequency signal.

6. The apparatus as in claim 1, wherein the controller is operative to transition the setting of the switching frequency from the first clock frequency signal to the second clock frequency signal depending on a phase difference between the first clock frequency signal with respect to the second clock frequency signal, the phase difference decreasing in magnitude over the multiple cycles.

7. The apparatus as in claim 1, wherein the second clock frequency signal is a master clock frequency signal, the first clock frequency signal being asynchronous with respect to the master clock frequency signal.

8. The apparatus as in claim 1, wherein the second clock frequency signal is a predetermined fixed frequency signal in which to operate the power converter during non-transient load conditions.

9. The apparatus as in claim 1, wherein the controller varies the first clock frequency signal depending on a magnitude of current consumption by a dynamic load powered by the output voltage of the power converter.

10. The apparatus as in claim 1, wherein the controller is operative to switchover from setting the switching frequency from the second clock frequency signal to the first clock frequency signal in response to detecting a change in current consumption by the dynamic load, the first clock frequency signal being greater in value than the second clock frequency signal.

11. The apparatus as in claim 1, wherein the controller is operative to adjust a setting of the first clock frequency signal, adjustment of the first clock frequency signal resulting in the phase alignment of the first clock frequency signal and the second clock frequency signal in fewer switching control cycles.

12. The apparatus as in claim 1, wherein the controller is operative to adjust a setting of the first clock frequency signal, the first clock frequency signal being adjusted within a threshold value of the second clock frequency signal in response to detecting a trigger event to set the switching frequency of the power converter back to the second clock frequency signal.

13. A method comprising:
 via a power converter, converting an input voltage into an output voltage;
 selecting a switching frequency applied to control switching operation of the power converter;
 transitioning a setting of the switching frequency from a first clock frequency signal to a second clock frequency signal in response to detected phase alignment of the first clock frequency signal and the second clock frequency signal;
 wherein a phase difference between the first clock frequency signal and the second clock frequency signal decreases for multiple cycles just prior to the transition of the setting; and
 wherein the phase difference between the first clock frequency signal and the second clock frequency signal increases for multiple cycles just after the transition of the setting.

14. The method as in claim 13 further comprising:
 monitoring the phase alignment of the first clock frequency signal and the second clock frequency signal, a magnitude of the phase alignment changing over each of the multiple cycles.

15. The method as in claim 13, wherein the first clock frequency signal is different but substantially equal to the second clock frequency signal.

16. The method as in claim 13, wherein the first clock frequency signal and the second clock frequency signal are set to different fixed frequency settings just prior to the transition of setting the switching frequency to the second clock frequency signal.

17. The method as in claim 13, wherein transitioning from the setting of the switching frequency from the first clock frequency signal to the second clock frequency signal occurs in response to detecting that a phase of the second clock frequency signal substantially aligns with a phase of the first clock frequency signal.

18. The method as in claim 13, wherein transitioning the setting of the switching frequency from the first clock frequency signal to the second clock frequency signal depends on a detected phase difference between the second clock frequency signal with respect to the first clock frequency signal.

19. The method as in claim 13, wherein the second clock frequency signal is a master clock frequency signal, the first clock frequency signal being an asynchronous clock frequency signal with respect to the master clock frequency signal.

20. The method as in claim 13, wherein the second clock frequency signal is a predetermined fixed frequency signal in which to operate the power converter during non-transient load conditions.

21. The method as in claim 13 further comprising:
 varying a value of the first clock frequency signal depending on a magnitude of current consumption by a dynamic load powered by the output voltage of the power converter.

22. The method as in claim 13 further comprising:
switching over from setting the switching frequency from the second clock frequency signal to the first clock frequency signal controlling the power converter in response to detecting a change in current consumption provided by the output voltage, the first clock frequency being greater in value than the second clock frequency.

23. The method as in claim 13 further comprising:
adjusting a value of the first clock frequency signal, adjustment of the first clock frequency signal resulting in the phase alignment of the first clock frequency signal and the second clock frequency signal in fewer switching control cycles.

24. The method as in claim 13 further comprising:
adjusting a value of the first clock frequency signal, the first clock frequency signal being adjusted within a threshold value of the second clock frequency signal in response to detecting a trigger event to set the switching frequency of the power converter back to the second clock frequency signal.

25. Computer-readable storage media having instructions stored thereon, the instructions, when executed by computer processor hardware, cause the computer processor hardware to:
convert an input voltage into an output voltage;
select a switching frequency applied to control switching operation of the power converter;
transition a setting of the switching frequency from a first clock frequency signal to a second clock frequency signal in response to detected phase alignment of the first clock frequency signal and the second clock frequency signal;
wherein a phase difference between the first clock frequency signal and the second clock frequency signal decreases for multiple cycles just prior to the transition; and
wherein the phase difference between the first clock frequency signal and the second clock frequency signal increases for multiple cycles just after the transition.

26. A system comprising:
a circuit substrate;
the apparatus of claim 1, the apparatus fabricated on the circuit substrate; and
a load, the load powered by the output voltage.

27. A method comprising:
receiving a circuit substrate; and
fabricating the apparatus of claim 1 on the circuit substrate.

28. An apparatus comprising:
a power converter to convert an input voltage into an output voltage;
a controller operative to: i) control a setting of a switching frequency applied to control switching operation of the power converter, and ii) transition a setting of the switching frequency from a first clock frequency signal to a second clock frequency signal in response to detected phase alignment of the first clock frequency signal and the second clock frequency signal;
wherein the controller is operative to monitor the phase alignment of the first clock frequency signal and the second clock frequency signal, the phase alignment changing over each of multiple control cycles of controlling the switching frequency; and
wherein the controller is further operable to, during the transition: i) set the switching frequency to the first clock frequency signal for first cycles of the multiple cycles, ii) detect the phase alignment while the switching frequency is set to the first clock frequency signal, and iii) switchover to setting the switching frequency to the second clock frequency signal in response to the phase alignment of the first clock frequency signal and the second clock frequency signal.

29. An apparatus comprising:
a power converter to convert an input voltage into an output voltage; and
a controller operative to: i) control a setting of a switching frequency applied to control switching operation of the power converter, and ii) transition a setting of the switching frequency from a first clock frequency signal to a second clock frequency signal in response to detected phase alignment of the first clock frequency signal and the second clock frequency signal;
wherein the phase alignment of the first clock frequency signal and the second clock frequency signal includes alignment of an edge of the first clock frequency signal to an edge of the second clock signal.

30. An apparatus comprising:
a power converter to convert an input voltage into an output voltage;
a controller operative to: i) control a setting of a switching frequency applied to control switching operation of the power converter, and ii) transition a setting of the switching frequency from a first clock frequency signal to a second clock frequency signal in response to detected phase alignment of the first clock frequency signal and the second clock frequency signal;
wherein the first clock frequency signal is a master clock frequency signal, the second clock frequency signal being asynchronous with respect to the master clock frequency signal; and
wherein the controller is further operable to: transition the setting of the switching frequency from the second first clock frequency signal to the first clock frequency signal depending on phase alignment of the second clock frequency signal and the first clock frequency signal.

31. The apparatus as in claim 30, wherein the controller is operative to switchover the setting of the switching frequency from the first clock frequency signal to the second clock frequency signal in response to detecting a change in current consumed by a load powered by the output voltage, the output voltage supplying current to the load.

32. An apparatus comprising:
a power converter to convert an input voltage into an output voltage;
a controller operative to: i) control a setting of a switching frequency applied to control switching operation of the power converter, and ii) transition a setting of the switching frequency from a first clock frequency signal to a second clock frequency signal in response to detected phase alignment of the first clock frequency signal and the second clock frequency signal; and
wherein the first clock frequency signal and the second clock frequency signal are temporarily aligned at a time of the transition.

33. The apparatus as in claim 1, wherein the controller is further operable to transition from the first clock frequency signal to the second clock frequency signal at a time in which an edge of the second clock frequency signal does not align with an edge of the first clock frequency signal.

34. An apparatus comprising:
a power converter to convert an input voltage into an output voltage;

a controller operative to: i) control a setting of a switching frequency applied to control switching operation of the power converter, and ii) transition a setting of the switching frequency from a first clock frequency signal to a second clock frequency signal in response to detected phase alignment of the first clock frequency signal and the second clock frequency signal; and wherein the first clock frequency signal is synchronized with a clock of a remote circuit.

35. An apparatus comprising:

a power converter to convert an input voltage into an output voltage;

a controller operative to: i) control a setting of a switching frequency applied to control switching operation of the power converter, and ii) transition a setting of the switching frequency from a first clock frequency signal to a second clock frequency signal in response to detected phase alignment of the first clock frequency signal and the second clock frequency signal;

wherein the controller is further operable to: at a first time instant, determine a condition in which to switchover the switching frequency from the first clock frequency signal to the second clock frequency signal, the condition occurring multiple clock cycles prior to the transition; and wherein the transition occurs a at a second time instant, the second time instant being delayed with respect to the first time instant.

36. The apparatus as in claim 35, wherein the first clock frequency signal and the second clock frequency signal are not aligned at the first time instant.

* * * * *